(12) United States Patent
Zones

(10) Patent No.: US 8,545,800 B1
(45) Date of Patent: Oct. 1, 2013

(54) MOLECULAR SIEVE SSZ-87

(75) Inventor: Stacey Ian Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 47 days.

(21) Appl. No.: 13/445,042

(22) Filed: Apr. 12, 2012

(51) Int. Cl.
*C01B 33/36* (2006.01)
*C01B 39/00* (2006.01)

(52) U.S. Cl.
USPC .......................................... 423/700; 423/718

(58) Field of Classification Search
None
See application file for complete search history.

(56) References Cited

U.S. PATENT DOCUMENTS

| 6,049,018 | A | 4/2000 | Calabro et al. |
| 6,656,268 | B2 | 12/2003 | Dhingra et al. |
| 2002/0081262 | A1 | 6/2002 | Elomari |
| 2002/0174824 | A1 | 11/2002 | Dhingra et al. |

OTHER PUBLICATIONS

PCT International Search Report, PCT/US2013/025837, mailed May 3, 2013.
S.I. Zones and S.-J. Hwang "A Novel Approach to Borosilicate Zeolite Synthesis in the Presence of Fluoride" Microporous Mesoporous Mater. 146 (2011) 48-56.

*Primary Examiner* — Bijay Saha
(74) *Attorney, Agent, or Firm* — Terrence Flaherty

(57) ABSTRACT

This disclosure is directed to a new crystalline molecular sieve designated SSZ-87, which is synthesized using an N,N'-diisopropyl-N,N'-diethylbicyclo[2.2.2]oct-7-ene-2,3:5,6-dipyrrolidinium dication as a structure directing agent.

7 Claims, 3 Drawing Sheets

MOLECULAR SIEVE SSZ-87

TECHNICAL FIELD

This disclosure relates to a new crystalline molecular sieve designated SSZ-87, a method for preparing SSZ-87 using an N,N'-diisopropyl-N,N'-diethylbicyclo[2.2.2]oct-7-ene-2,3: 5,6-dipyrrolidinium dication as a structure directing agent ("SDA") and uses for SSZ-87.

BACKGROUND

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new molecular sieves with desirable properties for gas separation and drying, hydrocarbon and chemical conversions, and other applications. New molecular sieves can contain novel internal pore architectures, providing enhanced selectivities in these processes.

SUMMARY

The present disclosure is directed to a new family of crystalline molecular sieves with unique properties, referred to herein as "molecular sieve SSZ-87" or simply "SSZ-87."

In one aspect, there is provided a molecular sieve having a mole ratio of 10 or greater of (1) at least one oxide of at least one tetravalent element to (2) optionally, one or more oxides selected from the group consisting of oxides of trivalent elements, pentavalent elements, and mixtures thereof, and having, in its calcined form, the powder X-ray diffraction (XRD) lines of Table 4. It should be noted that the phrase "mole ratio of 10 or greater" includes the case where there is no oxide (2), i.e., the mole ratio of oxide (1) to oxide (2) is infinity. In that case, the molecular sieve is comprised of essentially all of the oxide of one or more tetravalent elements.

In another aspect, there is provided a method for preparing a molecular sieve by contacting under crystallization conditions (1) at least one source of silicon; (2) at least one source of boron; (3) fluoride ions; and (4) an N,N'-diisopropyl-N,N'-diethylbicyclo[2.2.2]oct-7-ene-2,3:5,6-dipyrrolidinium dication.

In yet another aspect, there is provided a process for preparing a molecular sieve having, in its calcined form, the powder XRD lines of Table 4, by: (a) preparing a reaction mixture containing: (1) at least one source of silicon; (2) at least one source of boron; (3) fluoride ions; (4) an N,N'-diisopropyl-N,N'-diethylbicyclo[2.2.2]oct-7-ene-2,3:5,6-dipyrrolidinium dication; and (5) water; and (b) maintaining the reaction mixture under conditions sufficient to form crystals of the molecular sieve.

Where the molecular sieve formed is an intermediate material, the process disclosed herein includes a further post-crystallization processing step in order to achieve the target molecular sieve (e.g., by post-crystallization heteroatom lattice substitution or acid leaching).

There is also provided a novel molecular sieve designated SSZ-87 having a composition, as-synthesized and in its anhydrous state, in terms of mole ratios, as follows:

|  | Broad | Secondary |
|---|---|---|
| $SiO_2/B_2O_3$ | 10 to 200 | 10 to 100 |
| $Q/SiO_2$ | 0.015 to 0.06 | 0.025 to 0.06 | wherein Q is an N,N'-diisopropyl-N,N'-diethylbicyclo[2.2.2] oct-7-ene-2,3:5,6-dipyrrolidinium dication.

DETAILED DESCRIPTION

Introduction

Figure 1:
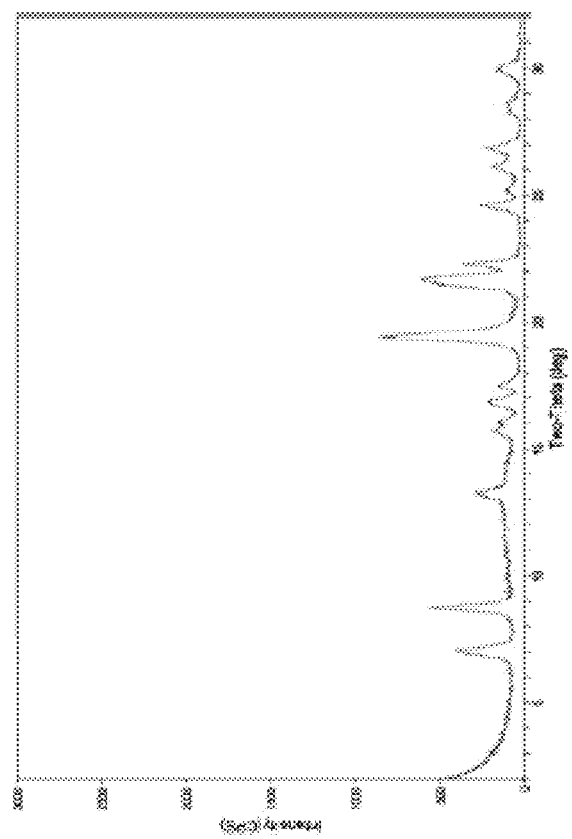
FIG. 1 shows the powder XRD pattern of the as-synthesized borosilicate SSZ-87 product of Example 1.

The following terms will be used throughout the specification and will have the following meanings unless otherwise indicated.

The term "active source" means a reagent or precursor material capable of supplying an element in a form that can react and be incorporated into the molecular sieve structure. The terms "source" and "active source" are used interchangeably herein.

The term "Periodic Table" refers to the version of the IUPAC Periodic Table of the Elements dated Jun. 22, 2007, and the numbering scheme for the Periodic Table Groups is as described in Chem. Eng. News 63(5), 26-27 (1985).

The term "molecular sieve" includes (a) intermediate and (b) final or target molecular sieves and molecular sieves produced by (1) direct synthesis or (2) post-crystallization treatment (secondary synthesis). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the boron for aluminum. Such techniques are known, for example as described in U.S. Pat. No. 6,790,433.

This disclosure is directed to a molecular sieve designated herein as "molecular sieve SSZ-87" or simply "SSZ-87."

In preparing SSZ-87, an N,N'-diisopropyl-N,N'-diethylbicyclo[2.2.2]oct-7-ene-2,3:5,6-dipyrrolidinium dication is used as a structure directing agent ("SDA"), also known as a crystallization template. The SDA useful for making SSZ-87 is represented by the following structure (1):

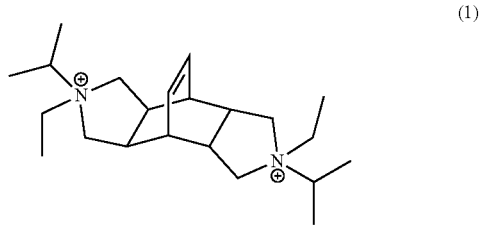 [SMILES: CC[N+]1(C(C)C)CC2C3C=CC(C2C1)C1C[N+](CC)(C(C)C)CC31]

(1)

The SDA dication is associated with anions which can be any anion that is not detrimental to the formation of SSZ-87.

Representative anions include those from Group 17 of the Periodic Table (e.g., fluoride, chloride, bromide and iodide), hydroxide, acetate, sulfate, tetrafluoroborate, carboxylate, and the like.

The N,N'-diisopropyl-N,N'-diethylbicyclo[2.2.2]oct-7-ene-2,3:5,6-dipyrrolidinium dication can be synthesized from, for example, bicyclo[2.2.2]oct-7-ene-2,3:5,6-tetracarboxylic dianhydride, which is a commercially available material. For instance, the N,N'-diisopropyl-N,N'-diethylbicyclo[2.2.2]oct-7-ene-2,3:5,6-dipyrrolidinium dication can be prepared from the dianhydride which is initially reacted with isopropylamine to produce the bicyclo N,N'-disopropyl diimide which is then reduced with $LiAlH_4$ to produce the diamine. The diamine can then be alkylated with an ethyl halide (e.g., iodoethane) to produce the N,N'-diisopropyl-N,N'-diethyl quaternary dication. Such methods are known, for example as described in U.S. Pat. No. 6,656,268.

Reaction Mixture

In general, SSZ-87 is prepared by: (a) preparing a reaction mixture containing (1) at least one source of silicon; (2) at least one source of boron; (3) fluoride ions; (4) an N,N'-diisopropyl-N,N'-diethylbicyclo[2.2.2]oct-7-ene-2,3:5,6-dipyrrolidinium dication; and (5) water; and (b) maintaining the reaction mixture under conditions sufficient to form crystals of the molecular sieve.

Where the molecular sieve formed is an intermediate molecular sieve, the process includes a further step of synthesizing a target molecular sieve by post-synthesis techniques, such as heteroatom lattice substitution techniques and acid leaching.

The composition of the reaction mixture from which the molecular sieve is formed, in terms of molar ratios, is identified in Table 1 below:

TABLE 1

| Reactants | Broad | Secondary |
| --- | --- | --- |
| $SiO_2/B_2O_3$ | 5 to 100 | 10 to 60 |
| $Q/SiO_2$ | 0.05 to 0.5 | 0.1 to 0.4 |
| $F/SiO_2$ | 0.05 to 0.5 | 0.1 to 0.4 |
| $H_2O/SiO_2$ | 10 to 100 | 15 to 25 | wherein compositional variable Q is as described herein above.

Sources useful herein for silicon include fumed silica, precipitated silicates, silica hydrogel, silicic acid, colloidal silica, tetra-alkyl orthosilicates (e.g., tetraethyl orthosilicate), and silica hydroxides.

Sources of boron which can be useful include borosilicate glasses, alkali borates, boric acid, borate esters, and certain molecular sieves. Non-limiting examples of a source of boron oxide include potassium tetraborate decahydrate and boron beta molecular sieve (B-beta molecular sieve).

Sources useful herein for fluoride ions (F) include hydrogen fluoride and ammonium fluoride.

For each embodiment described herein, the molecular sieve reaction mixture can be supplied by more than one source. Also, two or more reaction components can be provided by one source. For example, borosilicate molecular sieves may be synthesized by the method described herein using boron-containing beta zeolite as taught in U.S. Pat. No. 5,972,204.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

In practice, the molecular sieve is prepared by: (a) preparing a reaction mixture as described herein above; and (b) maintaining the reaction mixture under crystallization conditions sufficient to form crystals of the molecular sieve.

The reaction mixture is maintained at an elevated temperature until the crystals of the molecular sieve are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by a person skilled in the art that the molecular sieves described herein can contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for silicon used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more.

Where the molecular sieve formed is an intermediate molecular sieve, the target molecular sieve can be achieved using post-synthesis techniques such as heteroatom lattice substitution techniques. The target molecular sieve (e.g., silicate SSZ-87) can also be achieved by removing heteroatoms from the lattice by known techniques such as acid leaching.

The molecular sieve made from the process described herein can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

SSZ-87 is useful in catalysts for a variety of hydrocarbon conversion reactions such as hydrocracking, dewaxing, olefin isomerization, alkylation of aromatic compounds and the like. SSZ-87 is also useful as an adsorbent for separations.

Characterization of the Molecular Sieve

Molecular sieves made by the process described herein have a composition, as-synthesized and in the anhydrous state, as described in Table 2 (in terms of mole ratios), wherein compositional variable Q is as described herein above:

TABLE 2

|  | Broad | Secondary |
|---|---|---|
| $SiO_2/B_2O_3$ | 10 to 200 | 10 to 150 |
| $Q/SiO_2$ | 0.015 to 0.06 | 0.025 to 0.06 |

SSZ-87 can be an essentially all-silica material. As used herein, "essentially all-silica" or "essentially all silicon oxide" means that the molecular sieve's crystal structure is comprised of only silicon oxide, or is comprised of silicon oxide and only a trace amount of other oxides, such as aluminum oxide, which can be introduced as impurities in the source of silicon oxide. Thus, in a typical case where oxides of silicon and boron are used, SSZ-87 can be made essentially boron-free, i.e., having a silicon oxide to boron oxide mole ratio of ∞. SSZ-87 is made as a borosilicate and then the boron can be removed, if desired, by treating the borosilicate SSZ-87 with acetic acid at elevated temperature (as described by C. W. Jones et al. in *Chem. Mater.* 2001, 13, 1041-1050) to produce an essentially all-silica version of SSZ-87.

If desired, SSZ-87 can be made as a borosilicate and then the boron can be removed as described above and replaced with metal atoms by techniques known in the art. Aluminum, gallium, indium, and mixtures thereof can be added in this manner.

Molecular sieves synthesized by the process described herein are characterized by their X-ray diffraction pattern. The X-ray diffraction pattern lines of Table 3 are representative of as-synthesized SSZ-87. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/B mole ratio from sample to sample. Calcination can also cause minor shifts in the X-ray diffraction pattern. Notwithstanding these minor perturbations, the basic crystal lattice structure remains unchanged.

TABLE 3

Characteristic Peaks for As-Synthesized SSZ-87

| 2-Theta[a] | d-Spacing, nm | Relative Intensity[b] |
|---|---|---|
| 7.02 | 1.257 | M |
| 8.74 | 1.010 | S |
| 13.23 | 0.669 | W |
| 15.71 | 0.564 | W |
| 16.06 | 0.552 | W |
| 16.82 | 0.527 | W |
| 17.49 | 0.507 | W |
| 19.43 | 0.457 | VS |
| 21.62 | 0.411 | VS |
| 22.26 | 0.399 | M |
| 24.55 | 0.362 | M |
| 25.20 | 0.353 | W |
| 26.12 | 0.341 | M |
| 26.83 | 0.332 | W |
| 28.22 | 0.316 | W |
| 28.54 | 0.312 | W |
| 29.94 | 0.298 | W |

[a] ±0.20 degrees
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The X-ray diffraction pattern lines of Table 4 are representative of calcined SSZ-87.

TABLE 4

Characteristic Peaks for Calcined SSZ-87

| 2-Theta[a] | d-Spacing, nm | Relative Intensity[b] |
|---|---|---|
| 7.09 | 1.245 | VS |
| 8.78 | 1.006 | S |
| 9.95 | 0.889 | W |
| 13.36 | 0.662 | W |
| 16.04 | 0.553 | W |
| 16.88 | 0.525 | W |
| 17.51 | 0.506 | W |
| 19.48 | 0.455 | VS |
| 21.65 | 0.410 | VS |
| 22.24 | 0.399 | M |
| 24.52 | 0.363 | M |
| 25.17 | 0.354 | W |
| 26.17 | 0.340 | M |
| 26.87 | 0.331 | M |
| 28.28 | 0.315 | W |
| 28.58 | 0.312 | W |
| 29.94 | 0.298 | M |

[a] ±0.20 degrees
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks, and d, the interplanar spacing in Angstroms corresponding to the recorded lines, can be calculated.

EXAMPLES

The following illustrative examples are intended to be non-limiting.

Example 1

Synthesis of Borosilicate SSZ-87 (B-SSZ-87)

4.5 mmol of N,N'-diisopropyl-N,N'-diethylbicyclo[2.2.2]oct-7-ene-2,3:5,6-dipyrrolidinium dihydroxide and 14 mmol of tetraethyl orthosilicate were added to a Teflon container. Next, 1 mmol of boric acid and 4.5 mmol of ammonium fluoride were added to the container. The mixture was allowed to stand in a closed configuration. After two days, the top was opened and ethanol was allowed to evaporate. The $H_2O/SiO_2$ mole ratio was then adjusted to 20. The Teflon liner was then capped and sealed within a steel Parr autoclave. The autoclave was placed on a spit within a convection oven at 160° C. The autoclave was tumbled at 43 rpm over the course of 38 days in the heated oven. The autoclave was then removed and allowed to cool to room temperature. The solids were then recovered by filtration and washed thoroughly with deionized water. The solids were allowed to dry at room temperature.

The resulting product was analyzed by powder XRD. FIG. 1 shows the powder XRD pattern of the as-synthesized product of this Example. Table 5 below shows the powder XRD diffraction lines for the resulting product.

Elemental analysis indicated the product contained 37.9% Si and 0.757% B. CHN combustion analysis indicated the as-made product contained 11.34% C, 2.13% H and 1.24% N.

TABLE 5

| 2-Theta[a] | d-Spacing, nm | Relative Intensity (%) |
|---|---|---|
| 7.02 | 1.257 | 34.9 |
| 8.74 | 1.010 | 45.0 |
| 13.23 | 0.669 | 18.7 |
| 15.71 | 0.564 | 11.7 |
| 16.06 | 0.552 | 6.1 |
| 16.82 | 0.527 | 16.2 |
| 17.49 | 0.507 | 9.3 |
| 19.43 | 0.457 | 100.0 |
| 21.62 | 0.411 | 81.5 |
| 22.26 | 0.399 | 21.2 |
| 24.55 | 0.362 | 20.2 |
| 25.20 | 0.353 | 6.4 |
| 26.12 | 0.341 | 26.3 |
| 26.83 | 0.332 | 18.3 |
| 28.22 | 0.316 | 2.3 |
| 28.54 | 0.312 | 6.9 |
| 29.94 | 0.298 | 15.8 |

[a]±0.20

Example 2

Synthesis of SSZ-87 with Seeding

Example 1 was repeated except that seeds of SSZ-87 from a previous synthesis were added to the reaction mixture at about 3 wt. %. The crystalline product was formed in about two weeks.

Example 3

Synthesis Using a Concentrated Preparation

Example 1 was repeated except that the $H_2O/SiO_2$ mole ratio was reduced to about 5. No SSZ-87 seed material was added to this preparation. After about 6 weeks of reaction, the product collected was seen to be a version of MTW.

Example 4

Calcination of SSZ-87

Figure 2:
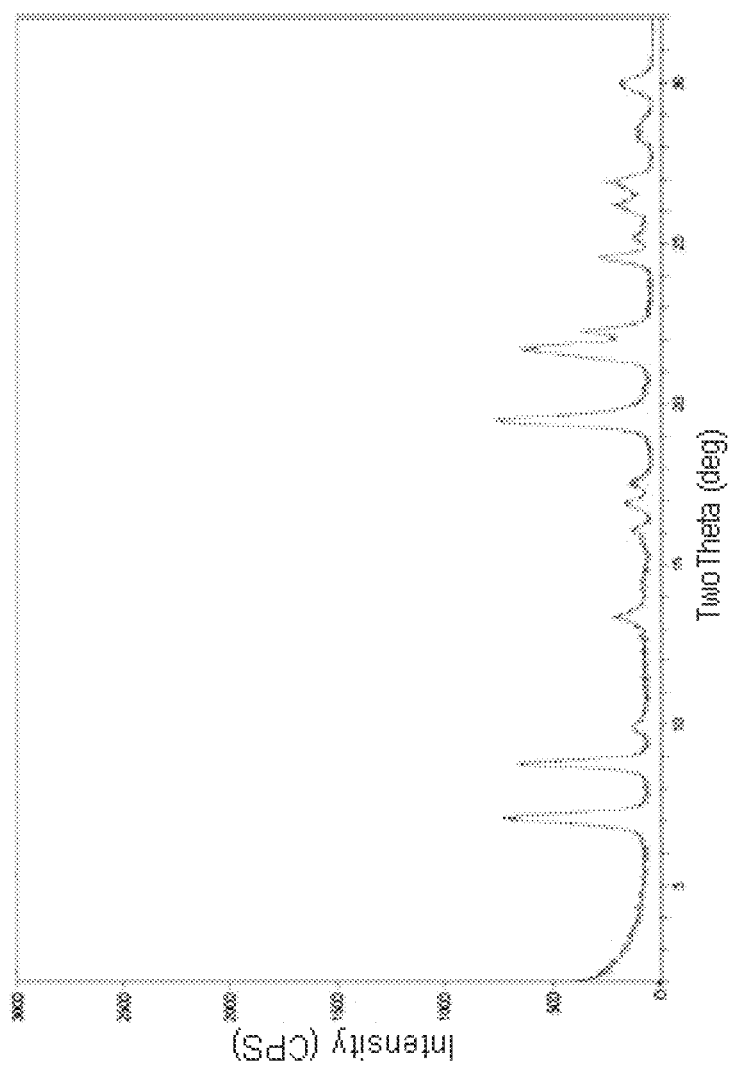
FIG. 2 shows the powder XRD pattern of the calcined borosilicate SSZ-87 product of Example 4.

The product of Example 1 was calcined in a muffle furnace under a flow of 2% oxygen/98% nitrogen heated at 595° C. at a rate of 1° C./min and held at 595° C. for five hours, cooled and then analyzed by powder XRD. The resulting XRD pattern is shown in FIG. 2. The powder XRD pattern indicates that the material remained stable after calcination to remove the organic SDA. Table 6 below shows the powder XRD diffraction lines for the calcined product.

TABLE 6

| 2-Theta[a] | d-Spacing, nm | Relative Intensity (%) |
|---|---|---|
| 7.09 | 1.245 | 84.7 |
| 8.78 | 1.006 | 58.3 |
| 9.95 | 0.889 | 6.3 |
| 13.36 | 0.662 | 16.9 |
| 16.04 | 0.553 | 11.0 |
| 16.88 | 0.525 | 10.9 |
| 17.51 | 0.506 | 9.0 |
| 19.48 | 0.455 | 100.0 |
| 21.65 | 0.410 | 85.8 |
| 22.24 | 0.399 | 30.3 |
| 24.52 | 0.363 | 22.9 |
| 25.17 | 0.354 | 11.2 |
| 26.17 | 0.340 | 32.2 |
| 26.87 | 0.331 | 22.1 |
| 28.28 | 0.315 | 5.2 |
| 28.58 | 0.312 | 8.2 |
| 29.94 | 0.298 | 22.3 |

[a]±0.20

Example 5

Micropore Volume Determination

Figure 3:
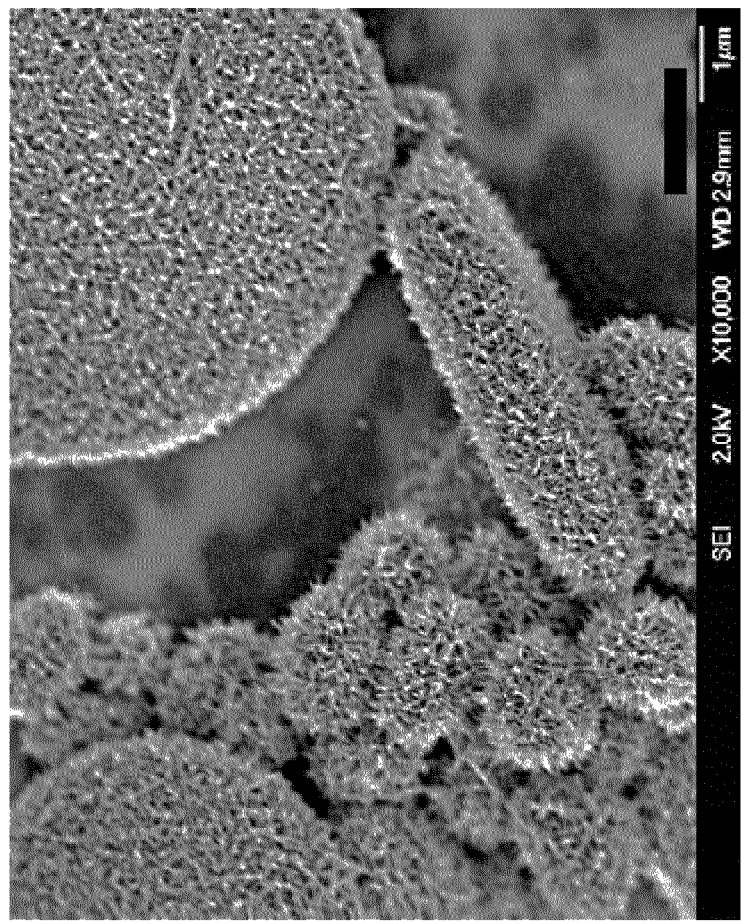
FIG. 3 shows the scanning electron microscopy (SEM) image of the calcined borosilicate SSZ-87 product of Example 4.

Calcined SSZ-87 of Example 4 was subjected to a surface area and micropore volume analysis using $N_2$ as adsorbate and via the BET method. A t-plot analysis of nitrogen physisorption data of the calcined product of Example 4 indicated a micropore volume of 0.17 $cm^3/g$ and an external BET surface area of 446 $m^2/g$. It can be seen that the calcined SSZ-87 has considerable porosity and external surface area. This is consistent with a very small crystal morphology which can be seen in the SEM of the product (FIG. 3).

Example 6

Al-Exchange of B-SSZ-87

The calcined borosilicate product of Example 4 was then converted to the aluminosilicate form following a procedure similar to that reported in U.S. Pat. No. 6,790,433. The resulting aluminum-containing SSZ-87 product was then washed with dilute HCl and then water, filtered and dried at room temperature in a vacuum filter. The powder XRD pattern was essentially the same as that of FIG. 2 except the introduction of aluminum for boron can be seen to change the lattice constants for the aluminosilicate product. Elemental analysis indicated the product contained 38.6% Si and 1.12% Al.

Example 7

Constraint Index Determination

The aluminosilicate product of Example 6 was pelletized at 4-5 kpsi and crushed and meshed to 20-40. 0.50 g was packed into a ⅜ inch stainless steel tube with alundum on both sides of the molecular sieve bed. A Lindburg furnace was used to heat the reactor tube. Helium was introduced into the reactor tube at 10 mL/min and at atmospheric pressure. The reactor was heated to about 371° C. and a 50/50 (w/w) feed of n-hexane and 3-methylpentane was introduced into the reactor at a rate of 8 μL/min. Feed delivery was made via a Brownlee pump. Direct sampling into a gas chromatograph (GC) began after 10 minutes of feed introduction. The Constraint Index value (not including 2-methylpentane) was calculated from the GC data using methods known in the art and was found to be between 1.11 and 0.89 for times on stream from 10 to 100 minutes. At 371° C. and 10 minutes on stream, feed conversion was greater than 50%, with a selectivity value near one. This indicates that the pore system of this material is larger than intermediate, but it is still hindered compared to open large pore molecular sieves.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A molecular sieve having a mole ratio of 10 or greater of (1) at least one oxide of at least one tetravalent element to (2) optionally, one or more oxides selected from the group consisting of oxides of trivalent elements, pentavalent elements, and mixtures thereof, and having, in its calcined form, an X-ray diffraction pattern substantially as shown in the following table:

| 2-Theta | d-Spacing, nm | Relative Intensity |
|---|---|---|
| 7.09 ± 0.20 | 1.245 | VS |
| 8.78 ± 0.20 | 1.006 | S |
| 9.95 ± 0.20 | 0.889 | W |
| 13.36 ± 0.20 | 0.662 | W |
| 16.04 ± 0.20 | 0.553 | W |
| 16.88 ± 0.20 | 0.525 | W |
| 17.51 ± 0.20 | 0.506 | W |
| 19.48 ± 0.20 | 0.455 | VS |
| 21.65 ± 0.20 | 0.410 | VS |
| 22.24 ± 0.20 | 0.399 | M |
| 24.52 ± 0.20 | 0.363 | M |
| 25.17 ± 0.20 | 0.354 | W |
| 26.17 ± 0.20 | 0.340 | M |
| 26.87 ± 0.20 | 0.331 | M |
| 28.28 ± 0.20 | 0.315 | W |
| 28.58 ± 0.20 | 0.312 | W |
| 29.94 ± 0.20 | 0.298 | M. |

2. The molecular sieve of claim 1, wherein the molecular sieve has a mole ratio of 10 or greater of (1) silicon oxide to (2) an oxide selected from boron oxide, aluminum oxide, gallium oxide, indium oxide, and mixtures thereof.

3. The molecular sieve of claim 2, wherein the oxides comprise silicon oxide and boron oxide.

4. The molecular sieve of claim 2, wherein the oxides comprise silicon oxide and aluminum oxide.

5. The molecular sieve of claim 2, wherein the molecular sieve comprises essentially all silicon oxide.

6. The molecular sieve of claim 1, wherein the molecular sieve has a composition, as-synthesized and in its anhydrous state, in terms of mole ratios as follows:

| | |
|---|---|
| $SiO_2/B_2O_3$ | 10 to 200 |
| $Q/SiO_2$ | 0.015 to 0.06 | wherein Q is an N,N'-diisopropyl-N,N'-diethylbicyclo[2.2.2]oct-7-ene-2,3:5,6-dipyrrolidinium dication.

7. The molecular sieve of claim 1, wherein the molecular sieve has a composition, as-synthesized and in its anhydrous state, in terms of mole ratios as follows:

| | |
|---|---|
| $SiO_2/B_2O_3$ | 10 to 100 |
| $Q/SiO_2$ | 0.025 to 0.06 | wherein Q is an N,N'-diisopropyl-N,N'-diethylbicyclo[2.2.2]oct-7-ene-2,3:5,6-dipyrrolidinium dication.

* * * * *